United States Patent
Miyazaki et al.

(10) Patent No.: US 6,325,316 B1
(45) Date of Patent: Dec. 4, 2001

(54) TAPE CARTRIDGE

(75) Inventors: Yukio Miyazaki; Masaru Ikebe; Kenji Hashizume, all of Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/453,080

(22) Filed: Dec. 2, 1999

(30) Foreign Application Priority Data

Dec. 4, 1998 (JP) .................................................. 10-345698

(51) Int. Cl.[7] .................................................. G11B 23/087
(52) U.S. Cl. .................................................. 242/343; 360/132
(58) Field of Search .................................... 242/343, 345, 242/345.3, 611, 611.1; 360/132

(56) References Cited

U.S. PATENT DOCUMENTS

| 4,719,529 | 1/1988 | Oishi et al. | 360/132 |
| 5,647,551 | 7/1997 | Ikeda et al. | 242/345 |

FOREIGN PATENT DOCUMENTS

| 675 790 | 10/1990 | (CH) . |
| 0 565 888 | 10/1993 | (EP) . |
| 2 223 479 | 11/1990 | (GB) . |
| 2-049031 | 12/1990 | (JP) . |

*Primary Examiner*—John Q. Nguyen
(74) *Attorney, Agent, or Firm*—Oblon, Spivak, McClelland, Maier & Neustadt, P.C.

(57) ABSTRACT

A tape cartridge includes a pair of hubs and a casing. The respective hubs include respective drums for winding a tape-shaped medium thereon and respective cylinders with respective driving shaft insertion bores for accepting respective driving shafts of a recording/reproducing device. The hubs are rotatably supported in the a casing having upper and lower halves. The casing has driving shaft insertion holes formed therein so as to accept the respective driving shafts. The cartridge includes a slider for slidably covering the respective driving shaft insertion holes and a hub brake engageable with the respective hubs. The respective hubs have teeth provided on respective upper portions thereof so as to be engageable with the hub brake. Recesses are formed between the respective drums and the respective inner cylinders so as to have respective upper ends thereof opened. The respective drums have respective outer peripheral surfaces between adjoining teeth conformed to inner peripheral surfaces of the respective recesses. The respective teeth have a portion extending into the respective recesses.

5 Claims, 9 Drawing Sheets

FIG. 9b
PRIOR ART

TAPE CARTRIDGE

CROSS-REFERENCE TO RELATED APPLICATIONS

This application is related to and claims priority, under 35 U.S.C. § 119, from Japanese Patent Application No. 10-345698, filed on Dec. 4, 1998, the entire contents of which is hereby incorporated by reference herein.

BACKGROUND OF THE INVENTION

1. Field of the Invention

The present invention relates to a tape cartridge for digital recording with a DDS (Digital Data Storage), a DAT (Digital Audio Tape) or another medium used.

2. Discussion of Background

Figure 8A:
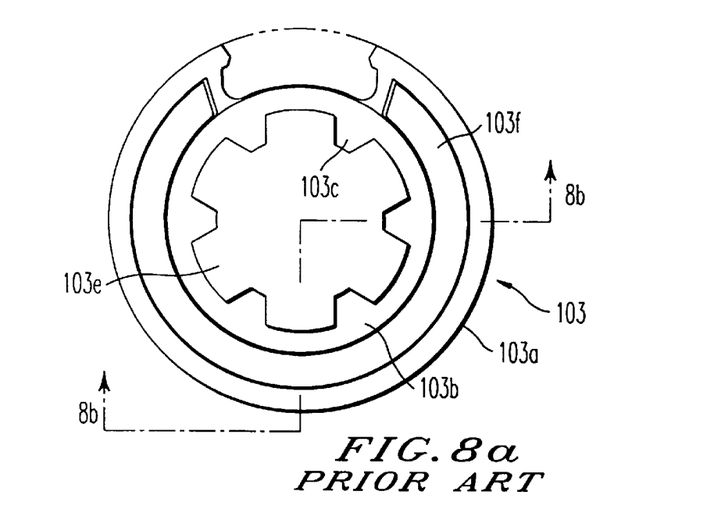
FIGS. 8(a), 8(b), and 8(c) are a bottom plan view, a cross-sectional view taken along line 8b—8b of FIG. 8(a), and a top plan view, respectively, all showing a conventional hub in detail.
Figure 8B:
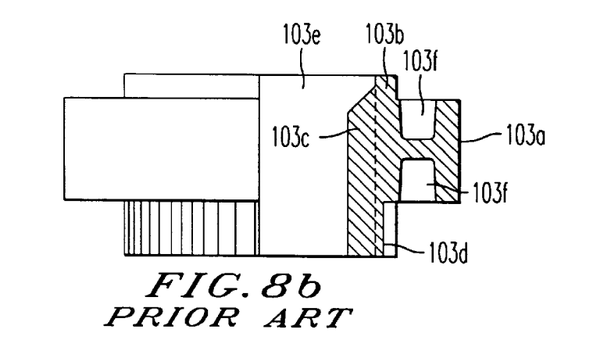
Figure 8C:
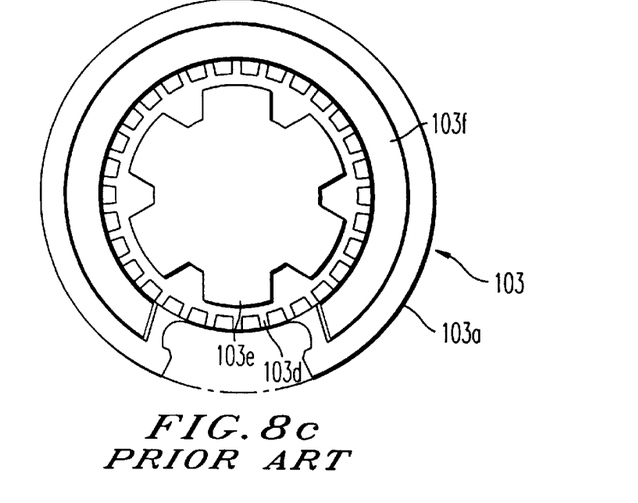

In such a type of conventional tape cartridge, a pair of hubs with a tape-shaped medium wound thereon are rotatably supported in a casing. In FIGS. 8(a), 8(b), and 8(c), a bottom plan view, a cross-sectional view taken along line 8b—8b of FIG. 8(a), and a top plan view, respectively, show an example of conventional hubs. Each hub 103 comprises a dram 103a at an outermost side and an inner cylinder 103b formed inside of and integrally with the drum 103a The drum 103a is a portion that has a tape-shaped medium wound on an outer periphery thereof.

The inner cylinder 103b has a bore 103e formed therein to accept a driving shaft of a recording/reproducing device. The hub 103 has teeth 103d formed on an outer periphery of an upper portion thereof to be engageable with a pawl of a hub brake. When the pawl of the hub brake have leading edges engaged into between teeth 103d, the hub 103 is locked against rotation.

Figure 9A:
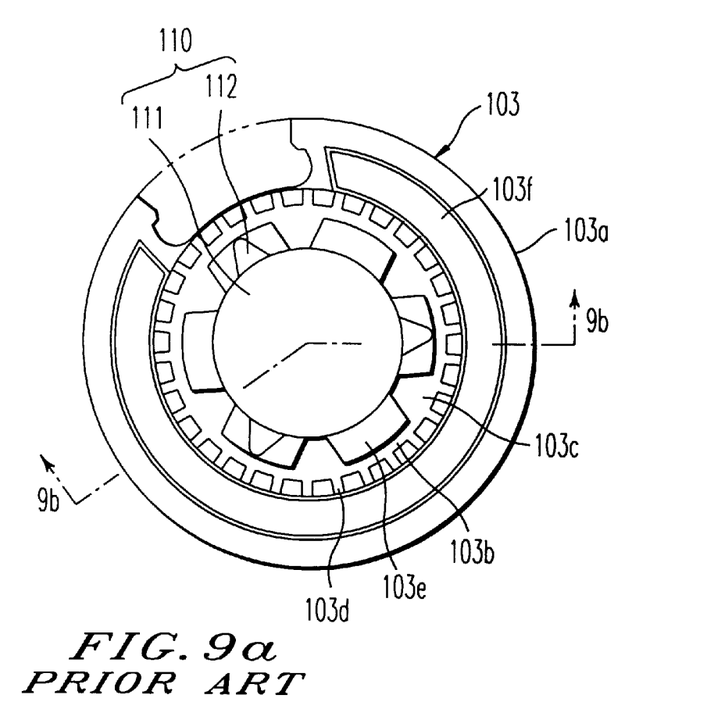
FIGS. 9(a) and 9(b) are a top plan view and a cross-sectional view taken along line 9b—9b of FIG. 9(a), respectively, both showing the conventional hub, of FIGS. 8(a), 8(b), and 8(c), with a driving shaft of a recording/reproducing device inserted into the bore of an internal cylinder thereof.
Figure 9B:
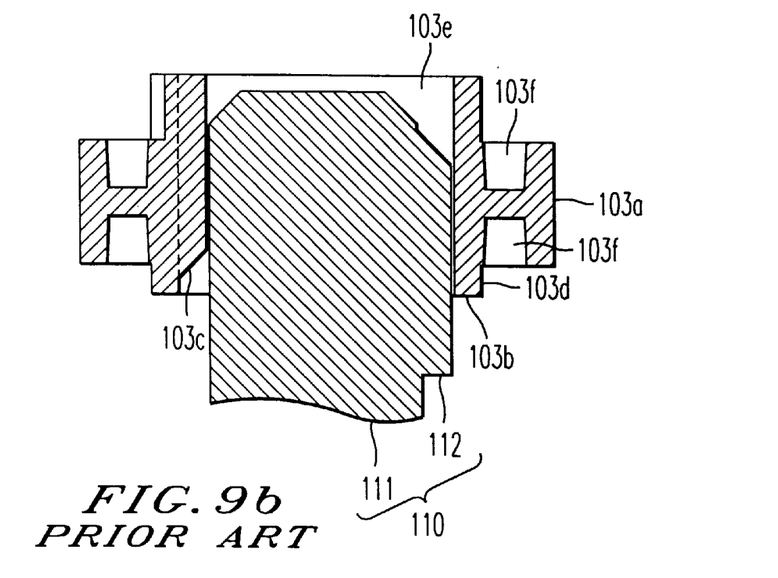

In FIGS. 9(a) and 9(b), a plan view and a cross-sectional view taken along line 9b—9b of FIG. 9(a), respectively, show a state wherein the driving shaft of a recording/reproducing device is inserted into the bore 103e of the inner cylinder 103b of the hub 103. The inner cylinder 103b has six projections 103c provided on an inner peripheral surface thereof in a peripheral direction at equal intervals to extend in a vertical direction. The driving shaft 110 has a core or root 111 and three engaging portions 112. The engaging portions 112 are provided on an outer peripheral surface of the driving shaft 110 at equal intervals to extend in the vertical direction. When the driving shaft 110 is inserted into the bore 103c of the hub 103, the respective engaging portions 112 are located between projection 103c to transmit rotation from the driving shaft 110 from the engaging portions 112 to the projections 103c, rotating the hub 103./

Recently, there have been demands to provide a tape cartridge having larger storage capacity for data storage. In order to increase the storage capacity, a tape-shaped medium is required to have a thinner thickness than conventional ones, allowing a greater tape length to be accepted. However, such a tape-shaped medium has a thickness limitation of about 5 μm in terms of production technique. From this viewpoint, the outer diameter of the drum 103a is required to be smaller than the conventional ones, allowing the tape length to be extended under the limitation.

The drum 103a is subjected to slow thermal shrinkage since the drum is thicker than surrounding parts. As a result, a phenomenon that a recess is formed by thermal shrinkage occurs in the drum in many cases. In order to prevent this phenomenon from occurring, preformed recesses 103f are formed in the drum. In order to prevent the occurrence of a recess due to thermal shrinkage in the drum 103a at the time of molding the drum, the preformed recesses 103f are formed in upper and lower portions of the drum to ensure that the drum 103a has a proper wall thickness. If the outer diameter of the drum 103a is decreased, the preformed recesses 103f are made smaller, creating problems in that the strength of portions of a mold for forming the preformed recesses 103f is weakened and that the form accuracy of the drum 103a is lowered.

It is an object of the present invention to make the outer diameter of drums smaller to wind a longer tape-shaped medium thereon without lowering the strength of a mold and the form accuracy of the drums.

In order to solve the problem, the present invention provides a tape cartridge comprising a pair of hubs, the respective hubs including respective drums for winding a tape-shaped medium thereon and respective inner cylinders with respective driving shaft insertion bores for accepting respective driving shafts of a recording/reproducing device, the respective inner cylinders being integrally molded with the respective drums; a casing including upper and lower halves, the casing rotatably supporting the hubs therein; driving shaft insertion holes formed in the casing, the respective driving shaft insertion holes accepting the respective driving shafts; a slider for slidably covering the respective driving shaft insertion holes; a hub brake engageable with the hubs; teeth provided on upper portions of the respective hubs so as to be engageable with the hub brake; recesses formed between the respective drums and the respective inner cylinders, the recesses having upper ends thereof opened; the respective drums having respective outer peripheral surfaces between adjoining teeth conformed to inner peripheral surfaces of the respective recesses; and the respective teeth having portions thereof extending into the respective recesses.

SUMMARY OF THE INVENTION

In the tape cartridge, the recesses may be provided at plural locations at certain intervals, reinforcing ribs may be provided between adjoining recesses to connect lower ends of the respective teeth and an inner peripheral surface of the respective drums, and the reinforcing ribs may be provided at locations except for locations where projections are provided, the projections being provided on the inner peripheral surface of the respective inner cylinders so as to be engageable with the respective driving shafts.

In the tape cartridge, the respective inner cylinders may have respective top plates formed on respective upper ends thereof to cover the respective driving shaft insertion holes.

In accordance with the present invention, the recesses are preformed between the respective drums and the respective inner cylinders, the respective drums have the respective outer peripheral surfaces between adjoining teeth conformed to the inner peripheral surfaces of the respective recesses, and the respective teeth have portions thereof extending into the respective recesses. This arrangement can reduce the outer diameter of the respective drums with the respective drums having a proper wall thickness and with the recesses having a certain volume.

In a preferred mode of the present invention, the reinforcing ribs are provided between adjoining recesses so as to be provided at locations except for the provision of the projections. This arrangement can prevent not only a recess from occurring due to thermal shrinkage in the drums but also the drums from leaning even if a tape-shaped medium is wound on the drums.

In another preferred mode of the present invention, the respective inner cylinders have the respective top plates formed on the respective upper ends thereof This arrangement can increase the strength of the inner cylinders with the teeth provided on the outer peripheral surfaces thereof. In addition, this arrangement can improve the moldability of the hubs by having a mold provided with a gate at a central portion on an outer surface of the top plate.

DETAILED DESCRIPTION OF THE PREFERRED EMBODIMENTS

Now, preferred embodiments of the present invention will be described in detail, referring to the accompanying drawings.

Figure 1:
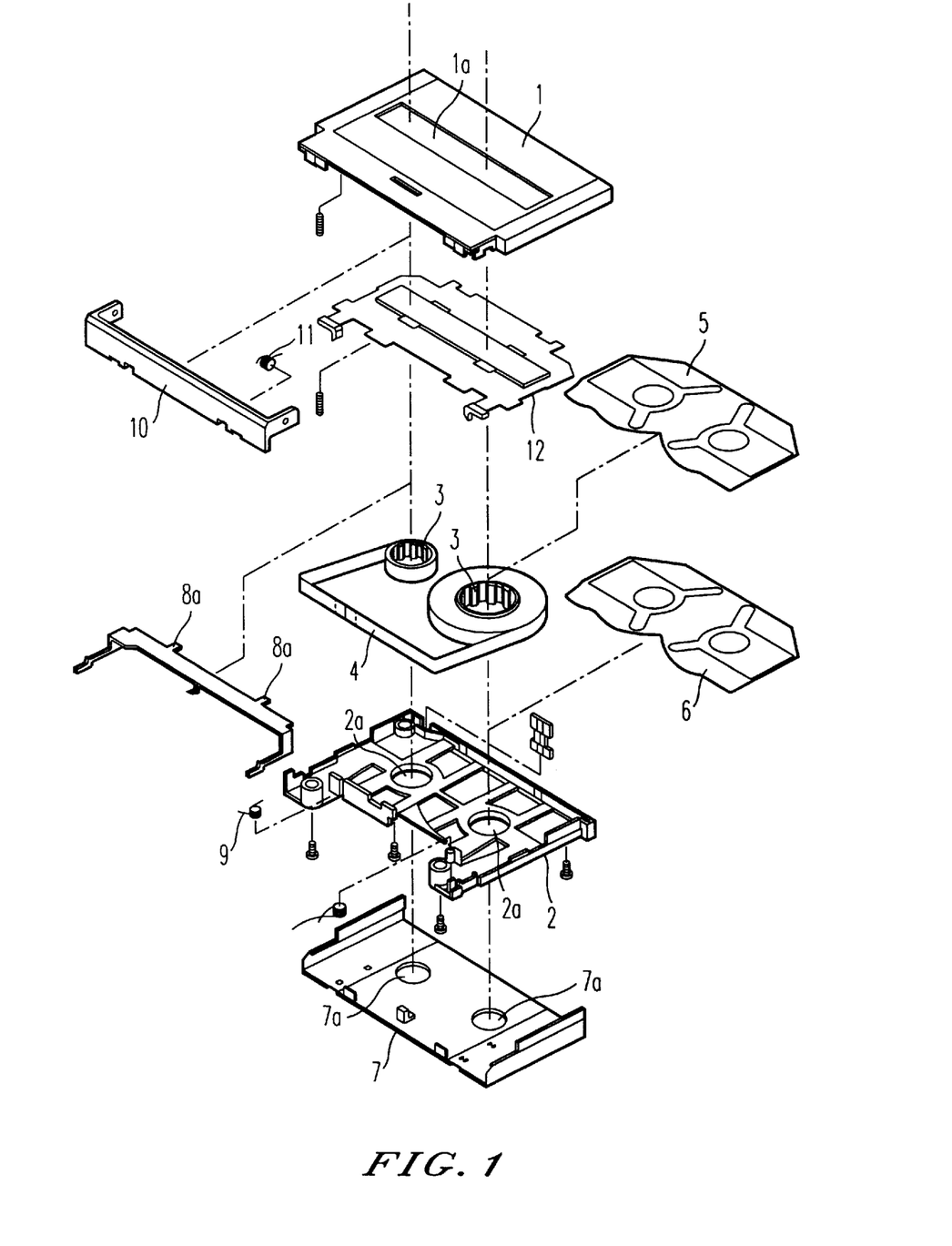
FIG. 1 is an exploded perspective view of the tape cartridge according to a first embodiment of the present invention.

In FIG. 1 is shown an exploded perspective view of the tape cartridge according to a first embodiment of the present invention. In the tape cartridge shown in FIG. 1, a casing comprises an upper half 1 and a lower half 2. In the casing is rotatably supported a pair of hubs 3, which have a tape-shaped medium (magnetic tape) 4 wound thereon for recording information. The tape-shaped medium 4 is provided so as to get outside from one end of a front side of a lower half 2, pass along the front side of the lower half 2 and return into the casing at the other end of the front side. The paired hubs 3 with the tape-shaped medium 4 wound thereon have an upper sheet 5 and a lower sheet 6 provided on respective upper sides and respective lower sides thereof.

The lower half 2 has a pair of driving shaft insertion holes 2a formed therein to accept respective tape driving shafts (not shown) of a recording/reproducing device. The hubs 3 are provided in recessed portions around the respective holes 2a.

The lower half 2 has a slider 7 slidably provided on a lower side thereof. The slider 7 covers the holes 2a in the lower half 2 when the tape cartridge is not used. When the tape cartridge is used, the slider 7 is slid to align holes 7a formed in the slider with the corresponding holes 2a in the lower half 2 so as to open the holes 2a in the lower half 2, providing a state wherein the driving shafts of a recording/reproducing device become acceptable.

Between the upper sheet 5 and the upper half 1 is provided a hub brake 8, which is slidable in a front and rear direction of the lower half 2. The hub brake 8 is urged toward the hubs 3 by a spring 9, and the hub brake 8 has pawls 8a engageable with the hubs 3. When the tape cartridge is not used, the pawls are engaged with the hubs 3 to prevent the hubs 3 from rotating. When the tape cartridge is used, the hub brake 8 is forwardly moved to be disengaged from the hubs 3, making the hubs rotatable.

The casing has the front side provided with a substantially angular U-character shaped lid (front lid) 10, which can open and close the front side. When the tape cartridge is not used, the slider 7 and the lid 10 cover the tape-shaped medium 4 extending along the front side of the lower half 2 for protection. When the tape cartridge is used, the slider 7 is backwardly slid, and the lid 10 is turned onto the upper half 1 to expose a portion of the tape-shaped medium 4 locating at the front side of the lower half 2. The lid 10 is urged in the closing direction by a spring 11.

The upper half 1 has a window opening 1a formed in a substantially rectangular shape therein. The upper half 1 has a flat window member 12 made of transparent resin fixed to an inner side thereof including the window opening 1a. Thus, the tape-shaped medium 4 is visible through the window opening 1a in the upper half 1.

Figure 2A:
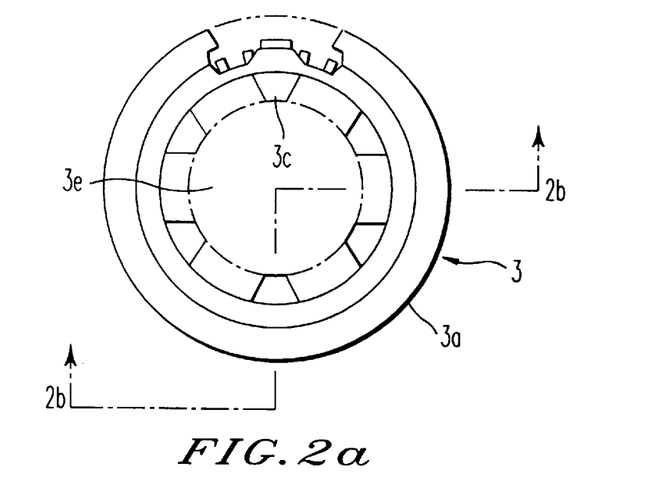
FIGS. 2(a), 2(b), and 2(c) are a bottom plan view, a cross-sectional view taken along line 2b—2b of FIG. 2(a), and a top plan view, respectively, all showing a hub of FIG. 1 in more detail.
Figure 2B:
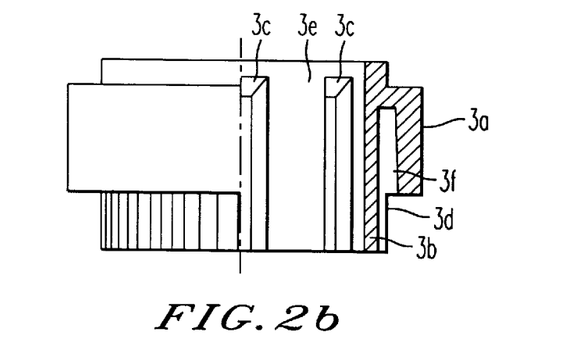
Figure 2C:
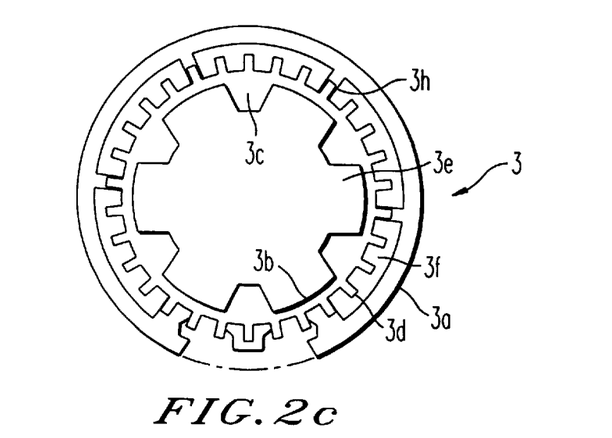

In FIGS. 2(a), 2(b), and 2(c), a bottom plan view, a cross-sectional view taken along line 2b—2b of FIG. 2(a), and a top plan view, respectively, all show one of the hubs 3 of FIG. 1 in more detail. The hub 3 comprises a drum 3a at an outermost side, and an inner cylinder 3b formed inside of and integrally with the drum 3a. The drum 3a is one that has the tape-shaped medium 4 wound on an outer periphery thereof The inner cylinder 3b has a bore (a driving shaft insertion hole) 3e formed therein to accept a driving shaft of a recording/reproducing device. The inner cylinder 3b has six projections 3c provided on an inner peripheral surface in the peripheral direction to extend in a vertical direction. The hub is integrally formed by injection molding.

The inner cylinder 3b of the hub 3 has an outer periphery provided with teeth 3d to be engageable with a pawl 8a of the hub brake 8. The drum 3a has recesses 3f formed therein so as to have an upper end opened (have a lower end closed). On the other hand, the drum has outer peripheral surfaces between adjoining teeth 3d formed to conform to the inner peripheral surface of the relevant recess 3f. The teeth 3d have respective lower portions extending in the respective relevant recesses 3f. By this arrangement, the drum 3a can have a smaller diameter than the conventional ones, and the drum 3a can have a proper wall thickness to prevent a recess from being formed by thermal shrinkage in the drum 3a. The recesses 3a can ensure to have a certain volume, allowing a mold to have certain strength.

In this embodiment, the recesses 3f are provided at plural locations so as to be spaced from one another, and reinforcing ribs 3h are provided between adjoining recesses 3f. The reinforcing ribs 3h connect the bases (the lower portions) of the teeth 3d and the inner peripheral surfaces of the dram 3a in the recesses 3f. Although it is sufficient that the reinforcing ribs 3h have a height not higher than the top surface of the drum 3a, the reinforcing ribs 3h have top surfaces formed so as to be flush with the top surface of the drums 3a in this embodiment. The provision of the reinforcing ribs 3h can prevent the drum 3a from leaning in an inward direction even if the tape-shaped medium 4 is tightly wound around the drum 3a When the reinforcing ribs 3h are provided at locations where the projections 3c, located on the inner peripheral surface of the inner cylinder 3b, are not provided, a recess due to thermal shrinkage can be prevented from occurring in the drum 3a since the reinforcing ribs 3h are not aligned with the projections 3c extending radially inwardly from the inner cylinder 3b.

By the arrangement stated earlier, the outer diameter of the drum 3a can be decreased by about 2–3 mm, for instance, in comparison with the outer diameter of the conventional ones. While the outer diameter of the conventional hubs 3 is about 15.0 mm, the present invention can reduce the outer diameter to about 12.5 mm. When the tape-shaped medium 4 to be wound on the drum 3 has a drum thickness of 8 μm, the medium can have a length extended by about 6.7 m.

Figure 3A:
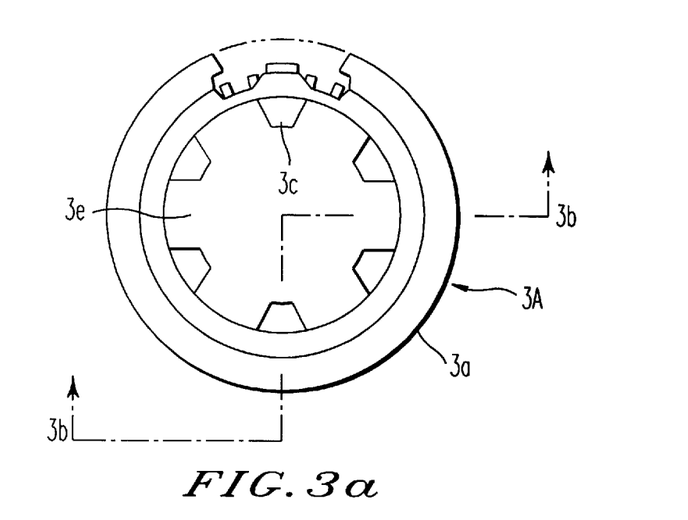
FIGS. 3(a), 3(b), and 3(c) are a bottom plan view, a cross-sectional view taken along line 3b—3b of FIG. 3(a), and a top plan view, respectively, all showing a hub of the tape cartridge according to a second embodiment of the present invention.
Figure 3B:
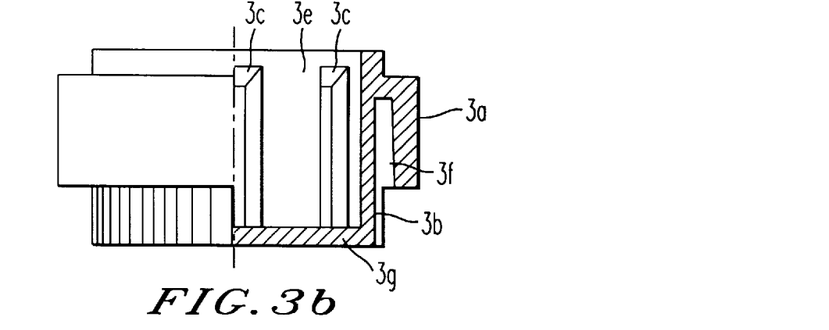
Figure 3C:
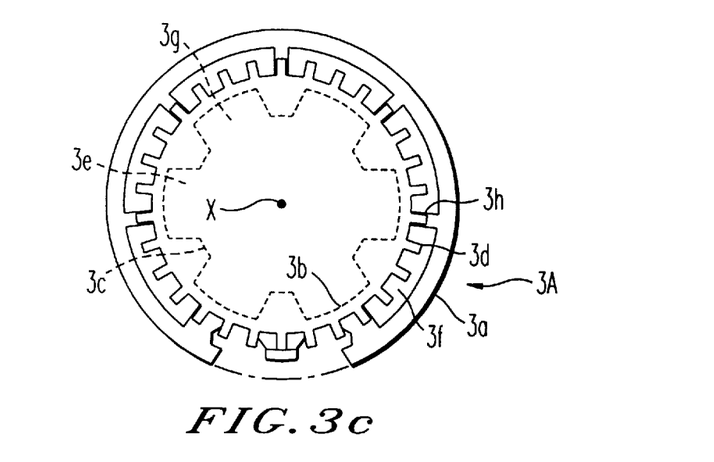

In FIGS. 3(a), 3(b), and 3(c), a bottom plan view, a cross-sectional view taken along line 3b—3b of FIG. 3(a), and a top plan view, respectively, all show a hub of the tape cartridge according to a second embodiment of the present invention. The hub 3A, according to the second embodiment, is different from the hub 3, according to the first embodiment, in that the hub 3A has a top plate 3g provided on the upper end thereof. The top plate 3g has a thickness of about 0.6 mm. The top plate 3g does not interfere with insertion of a driving shaft of a recording/reproducing device as long as the top plate has such a thickness. In other words, the top end of the driving shaft does not reach a lower side of the top plate 3g, even though the top end extends to a higher level that a central portion of the hub 3A in height. The provision of the top plate 3g can increase the strength of the inner cylinder 3b with the teeth 3d provided on the outer peripheral surface.

It is preferable that a mold for the tape cartridge according to the present invention has a gate located at a central portion on an upper side of the top plate 3g (the location indicated by X in FIG. 3(c)). In this case, even if the teeth 3d are thin-walled, the teeth can have improved moldability since the distances from the gate to the respective teeth 3d become equal. In addition, the variations in the width and the height of the respective teeth 3d can be eliminated to equalize the shape of the respective teeth 3d since the gate is located near to the respective teeth 3d. Thus, the teeth 3d can have improved precision.

Figure 4A:
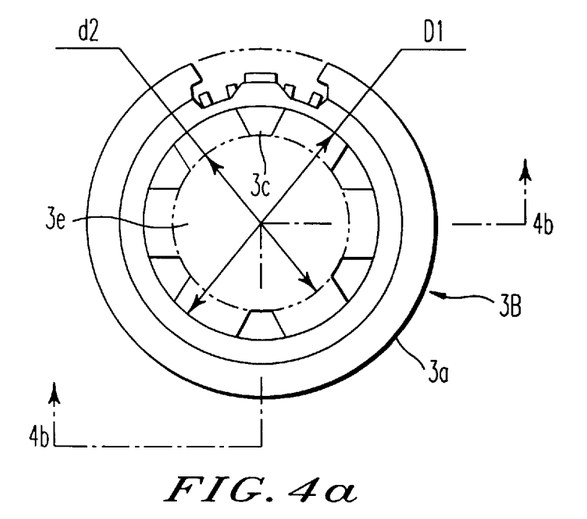
FIGS. 4(a), 4(b), and 4(c) are a bottom plan view, a cross-sectional view taken along line 4b—4b of FIG. 4(a), and a top plan view, respectively, all showing a hub of the tape cartridge according to a third embodiment of the present invention.
Figure 4B:
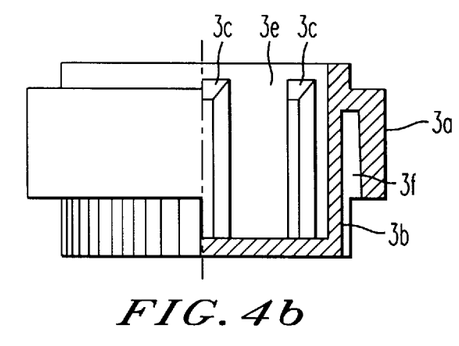
Figure 4C:
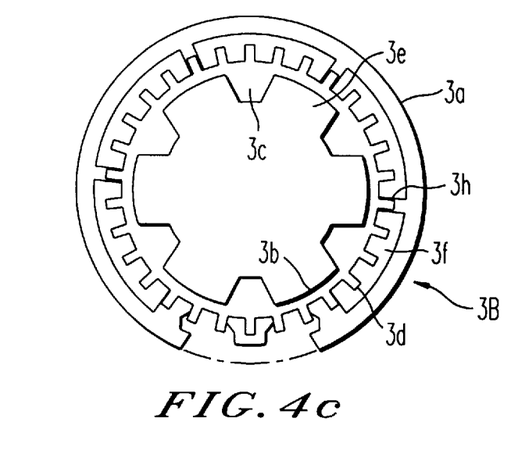

In FIGS. 4(a), 4(b), and 4(c), a bottom plan view, a cross-sectional view taken along line 4b—4b of FIG. 4(a), and a top plan view, respectively, all show a hub of the tape cartridge according to a third embodiment of the present invention. The hub 3B, according to the third embodiment, is different from the hub 3, according to the first embodiment, in that the hub 3B has a first inner diameter D1, for insertion of the driving shaft, set to be smaller than the diameter of the first embodiment, which means that the first inner diameter D1 is decreased by an increase in the thickness. In addition, the hub 3B has a second inner diameter D2 defined by the tops of the projections 3c (a portion with a core or root of the driving shaft inserted thereinto) set to be equal to that of the first embodiment, which means that the projections 3c have an inwardly projecting length decreased in comparison with that of the first embodiment.

Figure 5A:
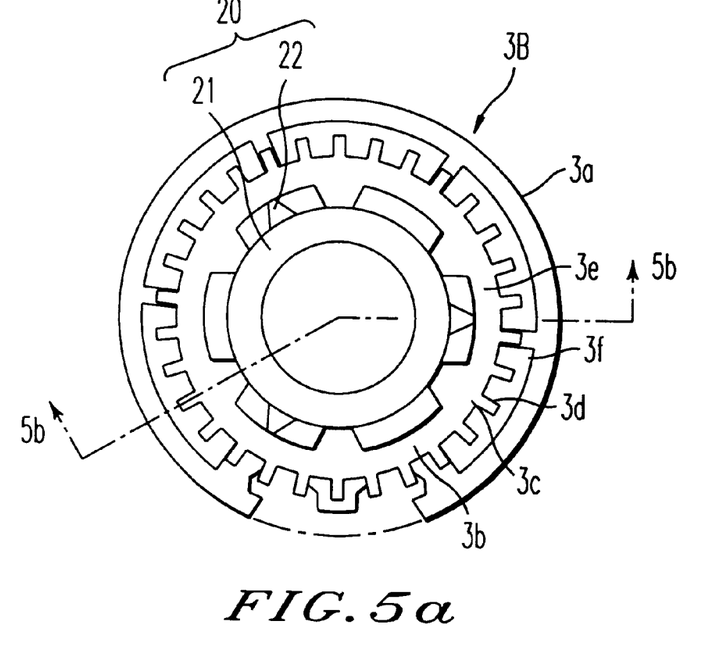
FIGS. 5(a) and 5(b) are a top plan view and a cross-sectional view taken along line 5b—5b of FIG. 5(a), respectively, both showing the hub of FIG. 4 with a driving shaft of a recording/reproducincg device engaged therewith.
Figure 5B:
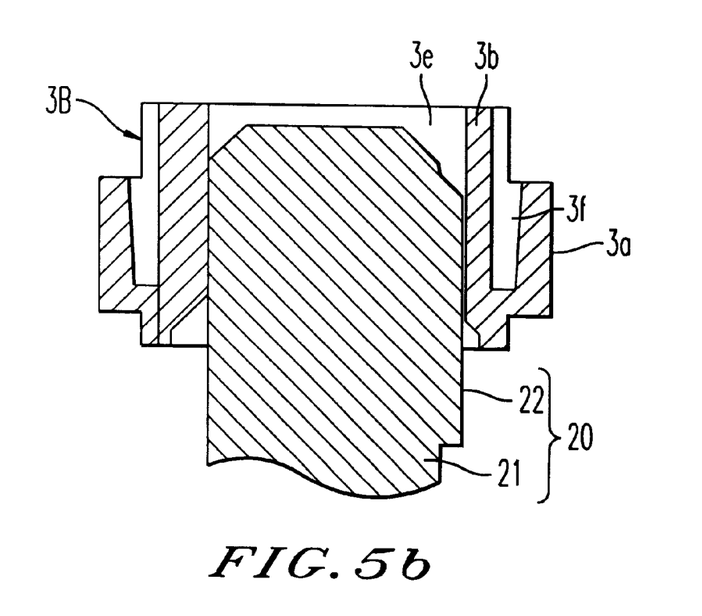

In FIGS. 5(a) and 5(b), a top plan view and a cross-sectional view taken along line 5b—5b of FIG. 5(a), respectively, both show a recording/reproducing device having a driving shaft 20 engaged with the hub 3B shown in FIG. 4. Although the driving shaft 20 has the core or root 21 formed in the same size as conventional ones, engaging portions 22, that are provided on the core or root 21, are formed to be lower that those of the conventional ones so that the length from the axial center of the driving shaft 20 to the top of the engaging portions 22 is slightly smaller than half of the first inner diameter D1 of the hub 3B. The core or root 21 of the driving shaft 20 has an outer diameter formed to be slightly smaller than the second inner diameter D2 of the hub 3B.

The reason why the driving shaft is thus formed will be explained.

The conventional tape cartridges (hereinbelow, referred to as the former tape cartridges) and a tape cartridge that has have a tape length extended to increase storage capacity (hereinbelow, referred to as the new tape cartridge) are different from each other in terms of characters, recording density and other factors of the tape-shaped medium 4. A recording/reproducing device matched with the new tape cartridge (hereinbelow, referred to as the new recording/reproducing device) is required to have specifications matched with the characters and the other factors of the tape-shaped medium 4 for the new tape cartridge.

On the other hand, conventional recording/reproducing devices (hereinbelow, referred to as the former recording/reproducing devices) are required not to accept the new tape cartridge since the former recording/reproducing devices do not match with the character and the other factors of the tape-shaped medium 4 for the new tape cartridge. The new recording/reproducing device is required to accept the former tape cartridges as well so as to be compatible with the former tape cartridges and the new tape cartridge. This is the reason why the first inner diameter D1 of the inner cylinder 3b of the hub 3B, and the distance between the tops of confronting engaging portions 22 of the driving shaft 20 of the new recording/reproducing device are shorter than usual.

Figure 6A:
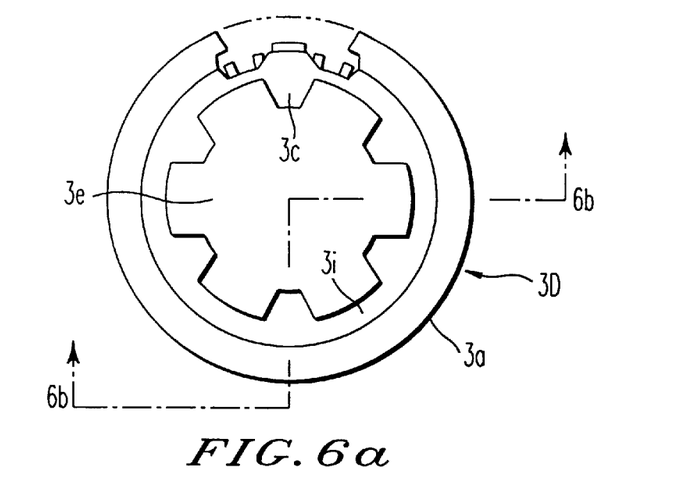
FIGS. 6(a), 6(b), and 6(c) are a bottom plan view, a cross-sectional view taken along view, respectively, all showing a hub of the tape cartridge according to a fourth embodiment of the present invention.
Figure 6B:
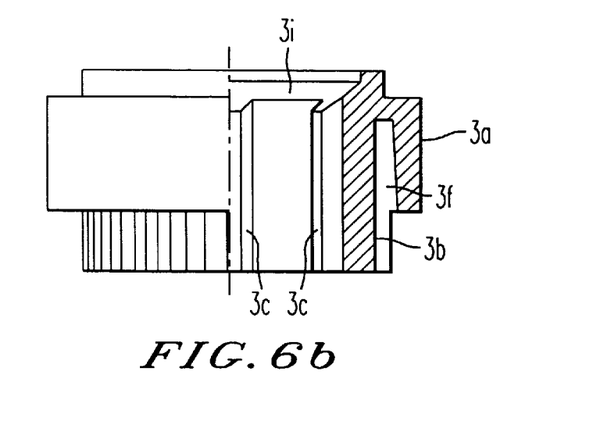
Figure 6C:
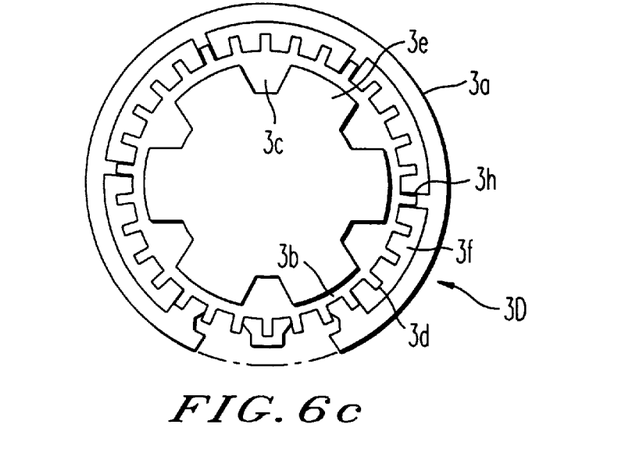

In FIGS. 6(a), 6(b), and 6(c), a bottom plan view, a cross-sectional view taken along line 6b—6b of FIG. 6(a), and a top plan view, respectively, all show a hub of the tape cartridge according to a fourth embodiment of the present invention.

Figure 7:
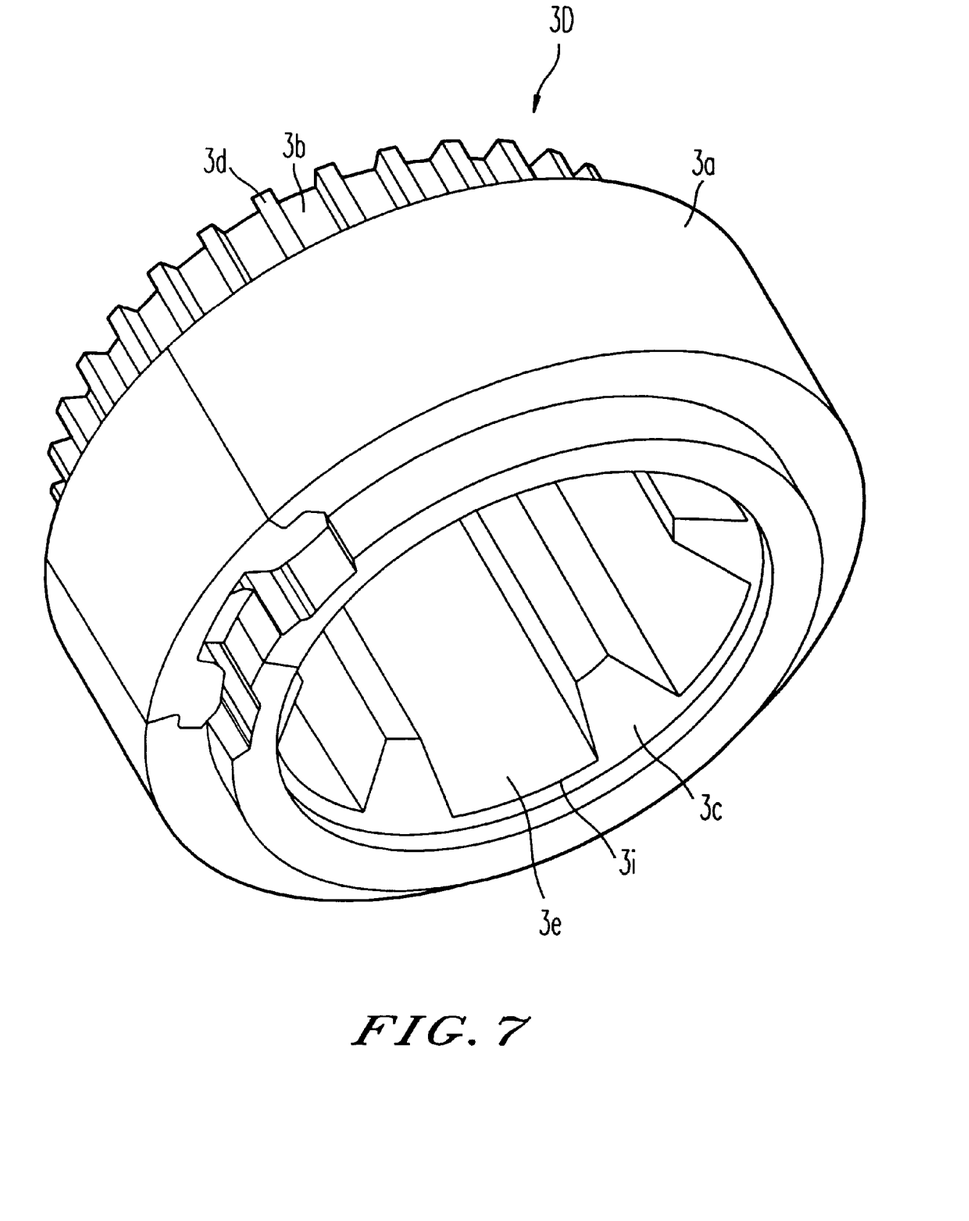
FIG. 7 is an exploded perspective view of the hub of FIG. 6 as viewed in a diagonal direction from a bottom of the hub.

In FIG. 7, an exploded perspective view of the hub 3D, of FIG. 6, is shown as viewed in a diagonal direction from the bottom of the hub 3D. The hub 3D, according to this embodiment, is different from the hub 3B, according to the third embodiment, in that the projections 3c have lower edges formed with a tapered surface 3i on the side of the inner peripheral surface of the inner cylinder 3b. The provision of the tapered surfaces 3i allows a driving shaft 20 of a recording/reproducing device to be smoothly accepted.

Numerous modifications and variations of the present invention are possible in light of the above teachings. It is therefor understood that within the scope of the appended claims, the present invention may be practiced otherwise than as specifically described herein.

What is claimed is:

1. A tape cartridge comprising:
   a pair of hubs, each of said hubs including a dram for winding a tape-shaped medium thereon and an inner cylinder with a driving shaft insertion bore for accepting a driving shaft of a recording/reproducing device, and each of said inner cylinders being integrally molded with a respective one of said drums;

a casing including upper and lower halves, said casing rotatably supporting said hubs therein;

driving shaft insertion holes formed in said casing, each of said driving shaft insertion holes accepting one of the driving shafts;

a slider for slidably covering each of said driving shaft insertion holes;

a hub brake engageable with each of said hubs;

teeth provided on upper portions of each of said hubs so as to be engageable with said hub brake;

recesses formed between said drum and said inner cylinder of each of said hubs, each of said recesses having an upper end thereof which is open; and a majority of said teeth having a portion thereof extending into a respective one of said recesses.

2. The tape cartridge according to claim 1, wherein each of said inner cylinders has a top plate formed on an upper end thereof to cover a respective one of each of said driving shaft insertion holes.

3. The tape cartridge according to claim 1, wherein said recesses are provided at plural locations at regularly spaced intervals, and further comprising:

reinforcing ribs provided between adjacent ones of said recesses to connect a lower end of each of said teeth to an inner peripheral surface of each of said drums, wherein said reinforcing ribs are provided only at locations in a circumferential direction of each of said hubs where radially inwardly extending projections not are provided, each of said projections being provided on an inner peripheral surface of each of said inner cylinders so as to be engageable with the driving shafts.

4. The tape cartridge according to claim 3, wherein each of said inner cylinders has a top plate formed on an upper end thereof to cover a respective one of each of said driving shaft insertion holes.

5. The tape cartridge according to claim 3, wherein each of said projections has a lower edge formed with a tapered surface on a side of an inner peripheral surface of each of said inner cylinders.

* * * * *